(12) United States Patent
Chen et al.

(10) Patent No.: US 8,631,077 B2
(45) Date of Patent: Jan. 14, 2014

(54) DUPLICATE E-MAIL CONTENT DETECTION AND AUTOMATIC DOCLINK CONVERSION

(75) Inventors: Yen-Fu Chen, Austin, TX (US); John Hans Handy-Bosma, Cedar Park, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2374 days.

(21) Appl. No.: 10/897,230

(22) Filed: Jul. 22, 2004

(65) Prior Publication Data
US 2006/0020668 A1    Jan. 26, 2006

(51) Int. Cl.
*G06F 15/16* (2006.01)
(52) U.S. Cl.
USPC ........ 709/206; 709/207; 709/208; 379/88.22; 379/93.24
(58) Field of Classification Search
USPC ......................................................... 709/207
See application file for complete search history.

(56) References Cited

U.S. PATENT DOCUMENTS

| | | |
|---|---|---|
| 5,694,616 A | 12/1997 | Johnson et al. |
| 5,754,778 A | 5/1998 | Shoujima |
| 5,805,830 A | 9/1998 | Reese et al. |
| 5,864,684 A | 1/1999 | Nielsen |
| 5,878,230 A | 3/1999 | Weber et al. |
| 5,893,914 A | 4/1999 | Clapp |
| 5,995,597 A * | 11/1999 | Woltz et al. ................ 379/93.24 |
| 6,044,395 A | 3/2000 | Costales et al. |
| 6,052,709 A | 4/2000 | Paul |
| 6,061,698 A | 5/2000 | Chadha et al. |
| 6,074,772 A | 6/2000 | Hofer et al. |
| 6,101,532 A | 8/2000 | Horibe et al. |
| 6,118,856 A | 9/2000 | Paarsmarkt et al. |
| 6,122,632 A | 9/2000 | Botts et al. |
| 6,163,809 A | 12/2000 | Buckley |
| 6,182,059 B1 | 1/2001 | Angotti et al. .................. 706/45 |
| 6,192,396 B1 * | 2/2001 | Kohler .......................... 709/206 |

(Continued)

OTHER PUBLICATIONS

"Selective Reciept of Document Elements in an Electronic Mail System", International Business Machines Corporation, Kenneth Mason Publications Ltd., Jan. 2000, p. 1.

(Continued)

*Primary Examiner* — Backhean Tiv
(74) *Attorney, Agent, or Firm* — Yee & Associates, P.C.; Arthur J. Samodovitz

(57) ABSTRACT

A Duplicate Content Storage and Access Program (DCSAP) identifies duplicate content, stores the duplicate content in one location, and provides a doclink to the stored duplicate content so that the doclink may be automatically replaced with the duplicate content. DCSAP examines email to determine whether the email contains a section identifier. A section identifier is a data element assigned by an algorithm in such a manner that no two section identifiers can be the same. If the email does not contain a section identifier, DCSAP embeds a section identifier into the email and forwards the email. If the email contains a section identifier, DCSAP extracts the section. DCSAP stores the extracted section in a repository and creates a doclink to the stored section. DCSAP then embeds a section identifier in the remainder of the email, and forwards the remainder and the doclink to the recipient. The doclink may be activated by the recipient, or it may be activated automatically. When activated the doclink resolves into the text of the corresponding section in the repository. Additional features such as security permissions, sorting preferences, and display effects may be added to the doclink.

6 Claims, 13 Drawing Sheets

(56) References Cited

U.S. PATENT DOCUMENTS

| | | | |
|---|---|---|---|
| 6,205,471 B1 | 3/2001 | Gilchrist et al. | 709/206 |
| 6,246,992 B1 | 6/2001 | Brown | |
| 6,247,045 B1 * | 6/2001 | Shaw et al. | 709/207 |
| 6,275,848 B1 | 8/2001 | Arnold | |
| 6,275,850 B1 | 8/2001 | Beyda et al. | |
| 6,289,372 B1 * | 9/2001 | Vyaznikov | 709/206 |
| 6,308,179 B1 | 10/2001 | Petersen et al. | |
| 6,324,569 B1 | 11/2001 | Ogilvie et al. | |
| 6,332,156 B1 | 12/2001 | Cho et al. | |
| 6,370,567 B1 | 4/2002 | Ouchi | |
| 6,389,475 B1 | 5/2002 | Speakman et al. | |
| 6,393,423 B1 * | 5/2002 | Goedken | 1/1 |
| 6,405,243 B1 | 6/2002 | Nielsen | |
| 6,415,290 B1 * | 7/2002 | Botts et al. | 707/709 |
| 6,424,828 B1 | 7/2002 | Collins et al. | |
| 6,424,996 B1 | 7/2002 | Killcommons et al. | |
| 6,427,076 B2 * | 7/2002 | Skog | 455/433 |
| 6,446,118 B1 | 9/2002 | Gottlieb | |
| 6,449,635 B1 | 9/2002 | Tilden, Jr. et al. | |
| 6,453,337 B2 | 9/2002 | Miller et al. | |
| 6,457,045 B1 | 9/2002 | Hanson et al. | |
| 6,476,930 B1 | 11/2002 | Roberts et al. | |
| 6,480,711 B1 * | 11/2002 | Guedalia | 455/412.1 |
| 6,480,885 B1 | 11/2002 | Olivier | |
| 6,484,196 B1 * | 11/2002 | Maurille | 709/206 |
| 6,496,849 B1 | 12/2002 | Hanson et al. | |
| 6,496,853 B1 | 12/2002 | Klein | |
| 6,505,233 B1 | 1/2003 | Hanson et al. | |
| 6,507,865 B1 | 1/2003 | Hanson et al. | |
| 6,529,942 B1 | 3/2003 | Gilbert | |
| 6,549,957 B1 | 4/2003 | Hanson et al. | |
| 6,553,425 B1 | 4/2003 | Shah et al. | |
| 6,563,912 B1 | 5/2003 | Dorfman et al. | |
| 6,563,913 B1 | 5/2003 | Kaghazian | |
| 6,574,671 B1 | 6/2003 | Haynes | |
| 6,578,025 B1 | 6/2003 | Pollack et al. | |
| 6,584,564 B2 | 6/2003 | Olkin et al. | |
| 6,615,241 B1 | 9/2003 | Miller et al. | |
| 6,643,684 B1 | 11/2003 | Malkin et al. | |
| 6,668,325 B1 | 12/2003 | Collberg et al. | |
| 6,687,741 B1 * | 2/2004 | Ramaley et al. | 709/206 |
| 6,704,772 B1 * | 3/2004 | Ahmed et al. | 709/207 |
| 6,705,381 B2 | 3/2004 | Huang | |
| 6,721,785 B1 | 4/2004 | Raghunandan | |
| 6,735,741 B1 * | 5/2004 | Pannu | 715/234 |
| 6,745,197 B2 | 6/2004 | McDonald | |
| 6,751,453 B2 | 6/2004 | Schemers et al. | |
| 6,775,689 B1 | 8/2004 | Raghunandan | |
| 6,789,107 B1 * | 9/2004 | Bates et al. | 709/206 |
| 6,802,067 B1 | 10/2004 | Camp et al. | |
| 6,816,868 B1 * | 11/2004 | Shimizu | 707/102 |
| 6,820,081 B1 | 11/2004 | Kawai et al. | |
| 6,823,368 B1 | 11/2004 | Ullmann et al. | |
| 6,826,596 B1 * | 11/2004 | Suzuki | 709/206 |
| 6,886,030 B1 * | 4/2005 | Easterbrook et al. | 709/206 |
| 6,925,605 B2 | 8/2005 | Bates et al. | |
| 6,970,907 B1 | 11/2005 | Ullmann et al. | |
| 6,972,861 B1 * | 12/2005 | van Zee et al. | 358/1.15 |
| 6,993,573 B2 * | 1/2006 | Hunter | 709/218 |
| 7,039,678 B1 | 5/2006 | Halahmi et al. | |
| 7,062,536 B2 * | 6/2006 | Fellenstein et al. | 709/206 |
| 7,103,634 B1 | 9/2006 | Ullmann et al. | |
| 7,107,518 B2 * | 9/2006 | Ramaley et al. | 715/235 |
| 7,111,046 B2 | 9/2006 | Watanabe et al. | |
| 7,130,885 B2 * | 10/2006 | Chandra et al. | 709/206 |
| 7,130,887 B2 | 10/2006 | Goldberg | |
| 7,136,180 B2 | 11/2006 | Utsunomiya | |
| 7,136,897 B1 * | 11/2006 | Raghunandan | 709/206 |
| 7,155,481 B2 * | 12/2006 | Prahlad et al. | 709/206 |
| 7,219,129 B2 | 5/2007 | Weissman | |
| 7,222,156 B2 | 5/2007 | Gupta et al. | |
| 7,257,610 B2 * | 8/2007 | Lai et al. | 705/78 |
| 7,275,214 B2 | 9/2007 | Itoh | |
| 7,305,381 B1 * | 12/2007 | Poppink et al. | 1/1 |
| 7,305,430 B2 * | 12/2007 | Choubey et al. | 709/203 |
| 7,328,241 B2 | 2/2008 | Ribak et al. | |
| 7,363,490 B2 * | 4/2008 | Paulsen et al. | 713/154 |
| 7,375,835 B1 * | 5/2008 | Hull et al. | 358/1.15 |
| 7,383,305 B2 | 6/2008 | Kelley et al. | |
| 7,596,603 B2 | 9/2009 | Chen et al. | |
| 7,801,960 B2 | 9/2010 | Hockey | |
| 7,844,676 B2 * | 11/2010 | Prahlad et al. | 709/206 |
| 7,890,593 B2 | 2/2011 | Chen et al. | |
| 8,131,806 B2 | 3/2012 | Chen et al. | |
| 8,214,444 B2 * | 7/2012 | Prahlad et al. | 709/206 |
| 2001/0047389 A1 * | 11/2001 | Prahlad et al. | 709/206 |
| 2002/0019827 A1 * | 2/2002 | Shiman et al. | 707/200 |
| 2002/0029247 A1 | 3/2002 | Kawamoto | |
| 2002/0046250 A1 | 4/2002 | Nassiri | |
| 2002/0052923 A1 * | 5/2002 | Anderson | 709/206 |
| 2002/0120702 A1 | 8/2002 | Schiavone et al. | |
| 2002/0122411 A1 * | 9/2002 | Zimmerman et al. | 370/349 |
| 2002/0138582 A1 * | 9/2002 | Chandra et al. | 709/206 |
| 2002/0138586 A1 | 9/2002 | Paleiov et al. | |
| 2002/0193986 A1 * | 12/2002 | Schirris | 704/8 |
| 2003/0061111 A1 | 3/2003 | Dutta et al. | |
| 2003/0070077 A1 * | 4/2003 | Redlich et al. | 713/182 |
| 2003/0093483 A1 | 5/2003 | Allen et al. | |
| 2003/0097414 A1 | 5/2003 | Cabello | |
| 2003/0101412 A1 * | 5/2003 | Eid | 715/513 |
| 2003/0195933 A1 * | 10/2003 | Curren et al. | 709/206 |
| 2003/0200272 A1 * | 10/2003 | Campise et al. | 709/206 |
| 2003/0223554 A1 * | 12/2003 | Zhang | 379/93.12 |
| 2003/0229900 A1 * | 12/2003 | Reisman | 725/87 |
| 2004/0024810 A1 * | 2/2004 | Choubey et al. | 709/203 |
| 2004/0034688 A1 * | 2/2004 | Dunn | 709/206 |
| 2004/0068544 A1 * | 4/2004 | Malik et al. | 709/206 |
| 2004/0078452 A1 * | 4/2004 | Jamieson | 709/218 |
| 2004/0139480 A1 * | 7/2004 | Delpuch et al. | 725/135 |
| 2004/0141004 A1 | 7/2004 | Cabezas et al. | |
| 2004/0260756 A1 | 12/2004 | Forstall et al. | |
| 2005/0021637 A1 | 1/2005 | Cox | |
| 2005/0038804 A1 * | 2/2005 | Shimizu | 707/100 |
| 2005/0039048 A1 * | 2/2005 | Tosey | 713/201 |
| 2005/0060372 A1 | 3/2005 | DeBettencourt et al. | |
| 2005/0108351 A1 | 5/2005 | Naick et al. | |
| 2005/0138109 A1 * | 6/2005 | Redlich et al. | 709/201 |
| 2005/0138133 A1 * | 6/2005 | Voticky et al. | 709/207 |
| 2005/0165740 A1 * | 7/2005 | Kerr et al. | 707/3 |
| 2005/0223061 A1 * | 10/2005 | Auerbach et al. | 709/206 |
| 2005/0267944 A1 | 12/2005 | Little, II | |
| 2005/0278426 A1 | 12/2005 | Blagg | |
| 2005/0289113 A1 * | 12/2005 | Bookstaff | 707/1 |
| 2006/0020668 A1 * | 1/2006 | Chen et al. | 709/206 |
| 2006/0041624 A1 | 2/2006 | Lyle et al. | |
| 2006/0041625 A1 | 2/2006 | Chen et al. | |
| 2006/0168044 A1 | 7/2006 | Chen et al. | |
| 2007/0036301 A1 * | 2/2007 | Voticky et al. | 379/88.22 |
| 2007/0110103 A1 * | 5/2007 | Zimmerman et al. | 370/474 |
| 2007/0143431 A1 * | 6/2007 | Prahlad et al. | 709/206 |
| 2008/0281823 A1 | 11/2008 | Chen et al. | |
| 2009/0319506 A1 | 12/2009 | Ngan | |
| 2010/0077323 A1 * | 3/2010 | Hunter | 715/760 |
| 2010/0106788 A1 * | 4/2010 | Lynn et al. | 709/206 |
| 2011/0072097 A1 * | 3/2011 | Prahlad et al. | 709/206 |

OTHER PUBLICATIONS

USPTO office action for U.S. Appl. No. 11/032,850 dated May 13, 2008.

USPTO final office action for U.S. Appl. No. 11/032,850 dated Dec. 1, 2008.

USPTO notice of allowance for U.S. Appl. No. 11/032,850 dated Apr. 17, 2009.

USPTO office action for U.S. Appl. No. 10/922,249 dated Apr. 17, 2008.

USPTO final office action for U.S. Appl. No. 10/922,249 dated Sep. 17, 2008.

USPTO final office action for U.S. Appl. No. 10/922,249 dated Dec. 11, 2008.

USPTO notice of allowance for U.S. Appl. No. 10/922,249 dated Jun. 2, 2009.

USPTO office action for U.S. Appl. No. 12/175,280 dated May 4, 2010.

(56) References Cited

OTHER PUBLICATIONS

Triad Consulting, "Getting the Most Out of Outlook: Rules, Calendars, Views", Mar. 11, 2004, 2003 convention http://www.triadconsulting.com/events/IAAP/2003_Convention/.

USPTO office action for U.S. Appl. No. 12/177,283 dated Apr. 12, 2011.

"How to Sort Addresses by Last Name in Outlook Express", Microsoft Outlook 2003, retrieved Jun. 20, 2007 http://support.microsoft.com/kb/282253/en-us.

Jackman, "Use These Five Tips to Control How Outlook 2003 Displays E-Mail", Sep. 22, 2004. http://www.techrepublic.com/article/use-these-five-tips-to-help-control-how-outlook-2003-displays-e-mail/5287013.

"Sort a Range", Microsoft Excel 2003, retrieved Jun. 20, 2007 http://office.microsoft.com/en-us/excel/HP052029541033.aspx?pid=CH062527971033&mode=print.

"Sort Your Inbox By Using Multiple Columns" Microsoft Outlook 2003, from office.microsoft.com, retrieved Jun. 20, 2007 http://office.microsoft.com/en-us/outlook/HA011499831033.aspx?pid=CH063564741033&mode=print.

Non-final office action dated Dec. 11, 2008 regarding U.S. Appl. No. 10/922,249, 18 pages.

Notice of allowance dated Oct. 4, 2010 regarding U.S. Appl. No. 12/175,280, 19 pages.

Final office action dated Oct. 4, 2011 regarding U.S. Appl. No. 12/177,283, 32 pages.

Final office action dated Dec. 28, 2010 regarding U.S. Appl. No. 12/175,300, 34 pages.

Non-final office action dated Jul. 2, 2010 regarding U.S. Appl. No. 12/175,300, 19 pages.

Notice of allowance dated Oct. 28, 2011 regarding U.S. Appl. No. 12/175,300, 12 pages.

Notice of allowance dated May 3, 2011 regarding U.S. Appl. No. 12/175,300, 11 pages.

Final office action dated Dec. 10, 2008 regarding U.S. Appl. No. 10/880,729, 16 pages.

Non-final office action dated Jul. 18, 2008 regarding U.S. Appl. No. 10/880,729, 14 pages.

Notice of allowance dated May 21, 2009 regarding U.S. Appl. No. 10/880,729, 18 pages.

* cited by examiner

| SEQUENCE | CONTENT | Kb | STORAGE TOTAL |
|---|---|---|---|
| 1 | 130 | 10 | 10 |
| 2 | 130, 140 | 20 | 30 |
| 3 | 130, 140, 150 | 30 | 60 |
| 4 | 130, 140, 150, 160 | 40 | 100 |
| 5 | 130, 140, 150, 160, 170 | 50 | 150 |

| SEQUENCE | DUPLICATE CONTENT | Kb | STORAGE TOTAL |
|---|---|---|---|
| 1 | 0 | 0 | 0 |
| 2 | 130 | 10 | 10 |
| 3 | 130, 140 | 20 | 30 |
| 4 | 130, 140, 150 | 30 | 60 |
| 5 | 130, 140, 150, 160 | 40 | 100 |

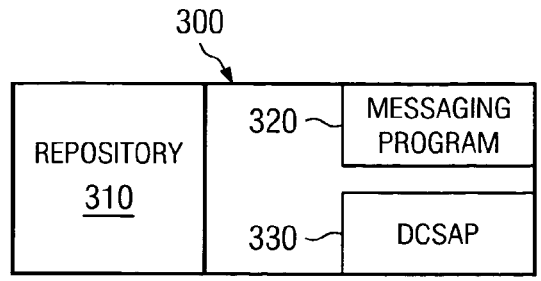
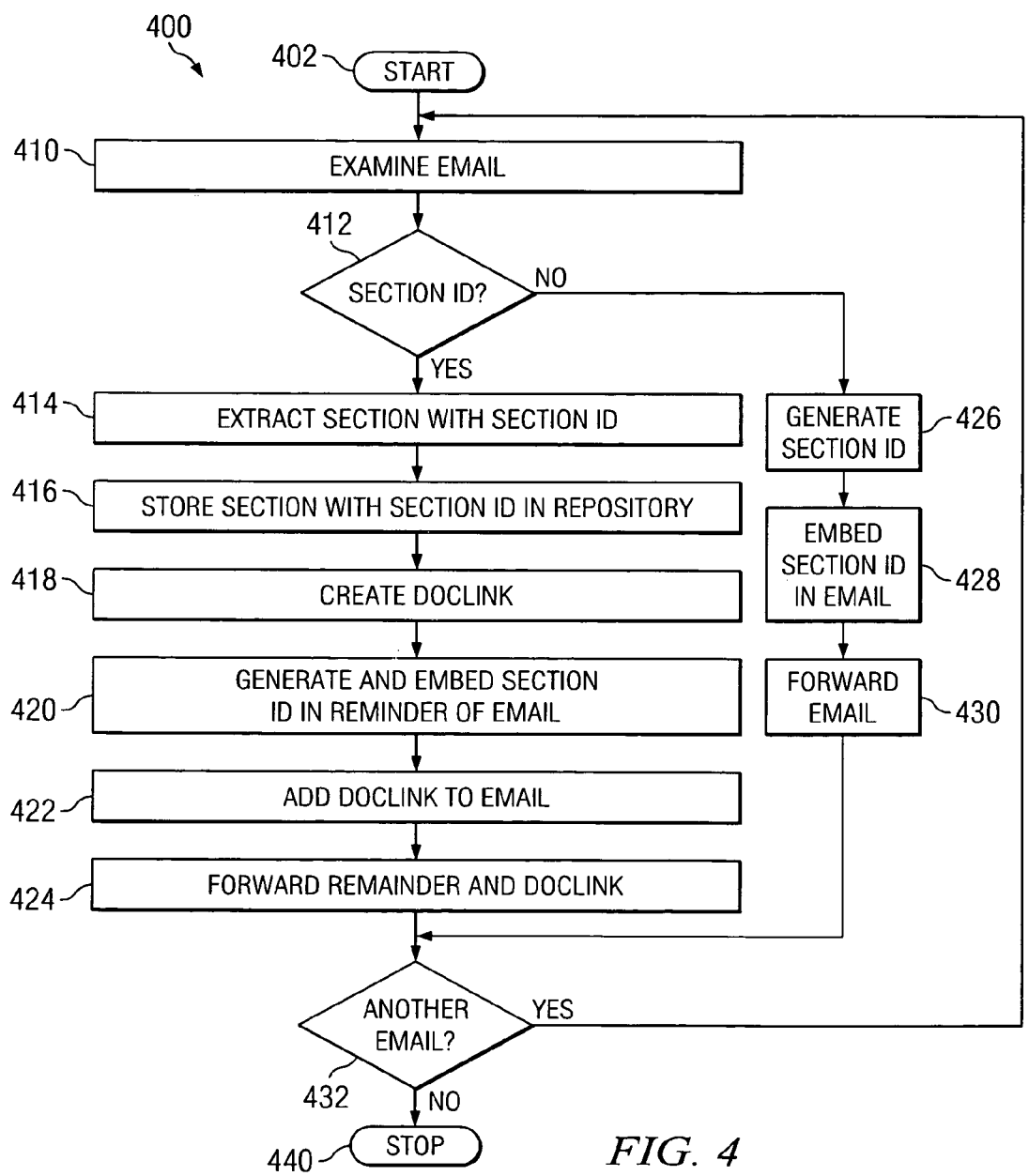

FIG. 15

| SECTION ID | DOCLINK | DESCRIPTION | USER ID | LINE | TIME | SECURITY | EFFECT |
|---|---|---|---|---|---|---|---|
| S1 | D1~532 | M1~530 | USER 1 | OFF | ON | OFF | COLOR |
| S2 | D2~538 | M2~536 | USER 2 | OFF | OFF | ON | OFF |
| S3 | D3~544 | M3~542 | USER 2 | OFF | OFF | ON | OFF |
| S4 | D4~550 | M4~548 | USER 1 | OFF | OFF | OFF | FONT |

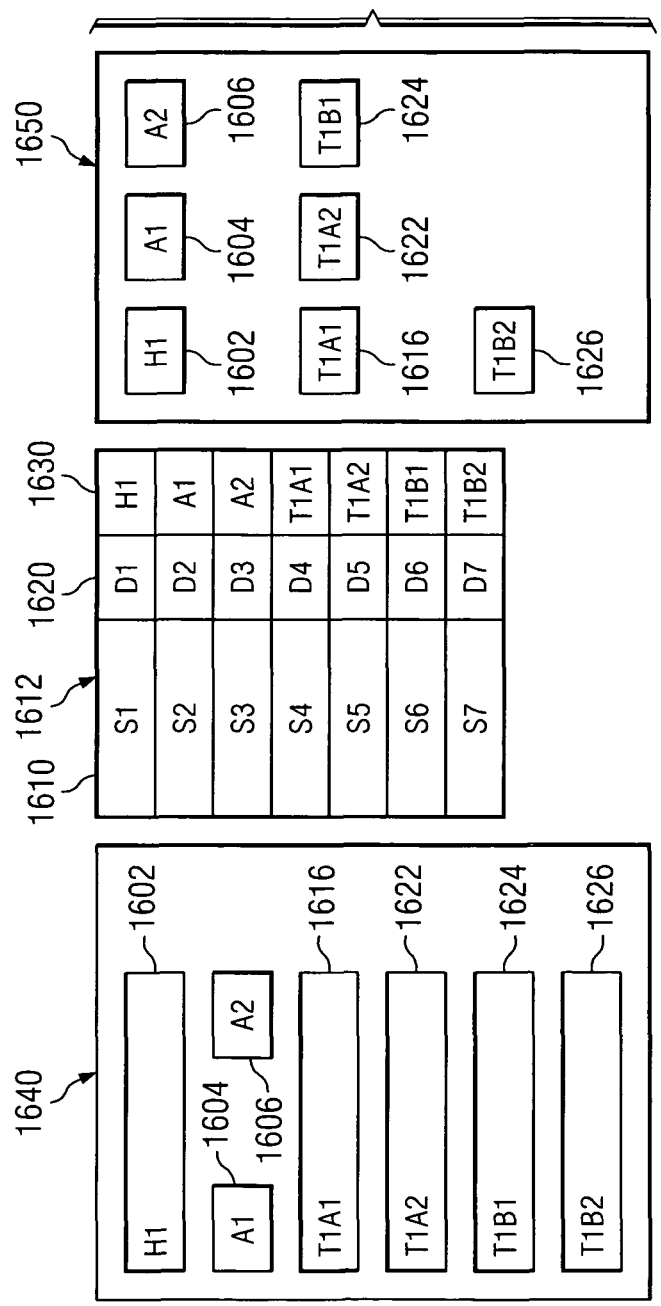

DUPLICATE E-MAIL CONTENT DETECTION AND AUTOMATIC DOCLINK CONVERSION

CROSS-REFERENCE TO RELATED APPLICATION

The present invention is related to the subject matter of U.S. patent application Ser. No. 10/880,729, incorporated herein by reference.

FIELD OF THE INVENTION

This invention is related to the field of electrical computers and digital processing systems in general, and specifically to processes used to reduce the computing resources necessary for storing electronic mail messages containing duplicate content.

BACKGROUND OF THE INVENTION

Currently, email clients such as MICROSOFT OUTLOOK and LOTUS NOTES enable a user to exchange electronic messages with other users through networked email servers. If a user wants to respond to a message, the user activates a "reply" command. In general, an email client responds to a "reply" command by creating a new message with the same subject line. Frequently the reply email contains the original message in addition to the reply text. Often, the original message is not deleted and many email clients copy the content of the original message into the reply message.

Copying the content of the original message into the reply message causes multiple copies of the original message to be stored on the email server and on the client's computer. The parties may engage in an exchange based on the original email. Each new reply may contain the text of all the previous emails. As the prior emails may not be deleted, this results in wasted disk space on the client, the server, or both.

The burden on storage systems may be further increased when both the sender and receiver keep records of an email locally as well as on the email server. Records may be kept locally for future reference. In addition, records retention may be mandated by law. Thus after several rounds of email conversation, both the sender and the receiver cause numerous duplicate emails to be in the memory of their local computers and of their email servers. One way to control the build up of message content in memory involves deleting messages after a pre-established expiration date passes. However, expiration dates may not meet the needs of the users, and may not be appropriate in industries having specified legal requirements.

Referring to FIG. 1, a prior art messaging system is represented by display 100 for a messaging program having a utility area 180 and a message text area 190. Message area 190 is shown with five messages between Dan and John that will be used to illustrate the problem of duplicate content storage. In sequence, first message 130 is the original message from Dan to John, second message 140 is John's reply to Dan, third message 150 is Dan's reply to John, fourth message 160 is John's reply to Dan, and fifth message 170 is Dan's reply to John. When fifth message 170 is sent, there will have been five separate message transmissions. The cumulative content can be seen by reference to FIG. 1A. For purposes of illustration, each message is set to have the same size of 10 Kb. Therefore, when first message 130 was originally sent, 10 Kb was stored. When second message 140 was sent in reply it carried first message 130 with it so that 20 Kb were stored. When third message 150 was sent it carried first message 130 and second message 140 with it so that 30 Kb were stored. When fourth message 160 was sent, it carried first message 130, second message 140, and third message 150 with it so that 40 Kb were stored. Finally, when fifth message 170 was sent, it will carry first message 130, second message 140, third message 150, and fourth message 160 along with it so that 50 Kb was stored. After the exchange of five messages a total of 150 Kb was stored. If there were multiple message recipients, then the storage figures would have been further multiplied.

An analysis of FIG. 1B shows that 100 Kb of the total kilobytes stored is due to storage of duplicate content. First message 130 is an original message, and therefore has no duplicate content in storage. When second message 140 is sent, the copy of first message 130 that is carried along is duplicate content of the original message. Therefore, 10 Kb of duplicate content is stored. The process of adding prior messages to each new reply message results in an accumulation of duplicate content. As shown in FIG. 1C, 100 Kb of duplicate content is stored after the fifth message has been sent. In the example, the storage of duplicate content is twice the amount of the original messages. Therefore, a need exists to reduce or eliminate storage of such duplicate content, and thereby save significant electronic storage space.

U.S. Pat. No. 6,704,772 discloses a method and system for reducing the amount oi storage space required when sending an email to multiple recipients. The method of the '772 patent reduces storage space by removing the body of the original email message and storing the body on a server. Each recipient of the email receives a link to the single message stored on the server. The link consists of a unique identification number matching that assigned to the body of the message as stored on the server. The '772 patent addresses storage of the body text of a single message sent to multiple recipients with a link to the message so that each recipient will be able to access one stored copy of the message. In like manner, a recipient of notification of a message, or a reply message, can use the message identifier number to access the message and all reply messages associated with the original message.

What is needed beyond the prior art is a method to eliminate storage of duplicate content while permitting selective access to individual reply messages in a thread of communication between an originator and a receiver of an original message text.

SUMMARY OF THE INVENTION

The invention that meets the needs described above is an email cleaning utility, called a Duplicate Content Storage and Access Program (DCSAP), that identifies duplicate content, stores the duplicate content in one location, and provides a doclink to the stored duplicate content so that the doclink may be automatically replaced with the duplicate content. DCSAP examines email to determine whether the email contains a section identifier. A section identifier is a data element assigned by an algorithm in such a manner that no two section identifiers can be the same. If the email does not contain a section identifier, DCSAP embeds a section identifier into the email and forwards the email. If the email contains a section identifier, DCSAP extracts the section. DCSAP stores the extracted section in a repository and creates a doclink to the stored section. DCSAP then embeds a section identifier in the remainder of the email, and forwards the remainder and the doclink to the recipient. The doclink may be activated by the recipient, or it may be activated automatically. When activated the doclink resolves into the text of the corresponding section in the repository. Additional features such as security permissions, sorting preferences, and display effects may be added to the doclink.

These and other objects of the invention will be apparent to those skilled in the art from the following detailed description of a preferred embodiment of the invention.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts a representative computer memory in which the invention may reside.

FIG. 4 depicts a flow chart of the Duplicate Content Storage and Access Program (DCSAP).

FIG. 15 depicts a table showing additional data that can be added to the unique section identification.

FIG. 16A through 16C depict various section options.

DETAILED DESCRIPTION OF THE PREFERRED EMBODIMENT

A person of ordinary skill in the art will appreciate that the present invention may be implemented in a variety of software and hardware configurations. It is believed, however, that the invention is described best as a computer program that configures and enables one or more general-purpose computers to implement the novel aspects of the invention.

As used herein, "attachment" means a file that is transmitted with an email that is not part of any messages in the email itself.

As used herein, "computer" means a machine having a processor, a memory, and an operating system, capable of interaction with a user or other computer, and shall include without limitation desktop computers, notebook computers, tablet computers, personal digital assistants (PDAs), servers, handheld computers, and similar devices.

As used herein, "doclink" means a control that can resolve itself into a copy of a section stored in a repository and also restore itself and delete the copy.

As used herein, "section" means a message or a portion of a message.

As used herein, "message" means an electronic mail message transmitted between user terminals over a computer network.

As used herein, "section identifier" means a data element assigned by an algorithm in such a manner that each section identifier is unique.

As used herein, "repository" means a portion of a memory, or of a distributed memory, in which sections of a message are stored for access by a doclink.

Figure 1A:
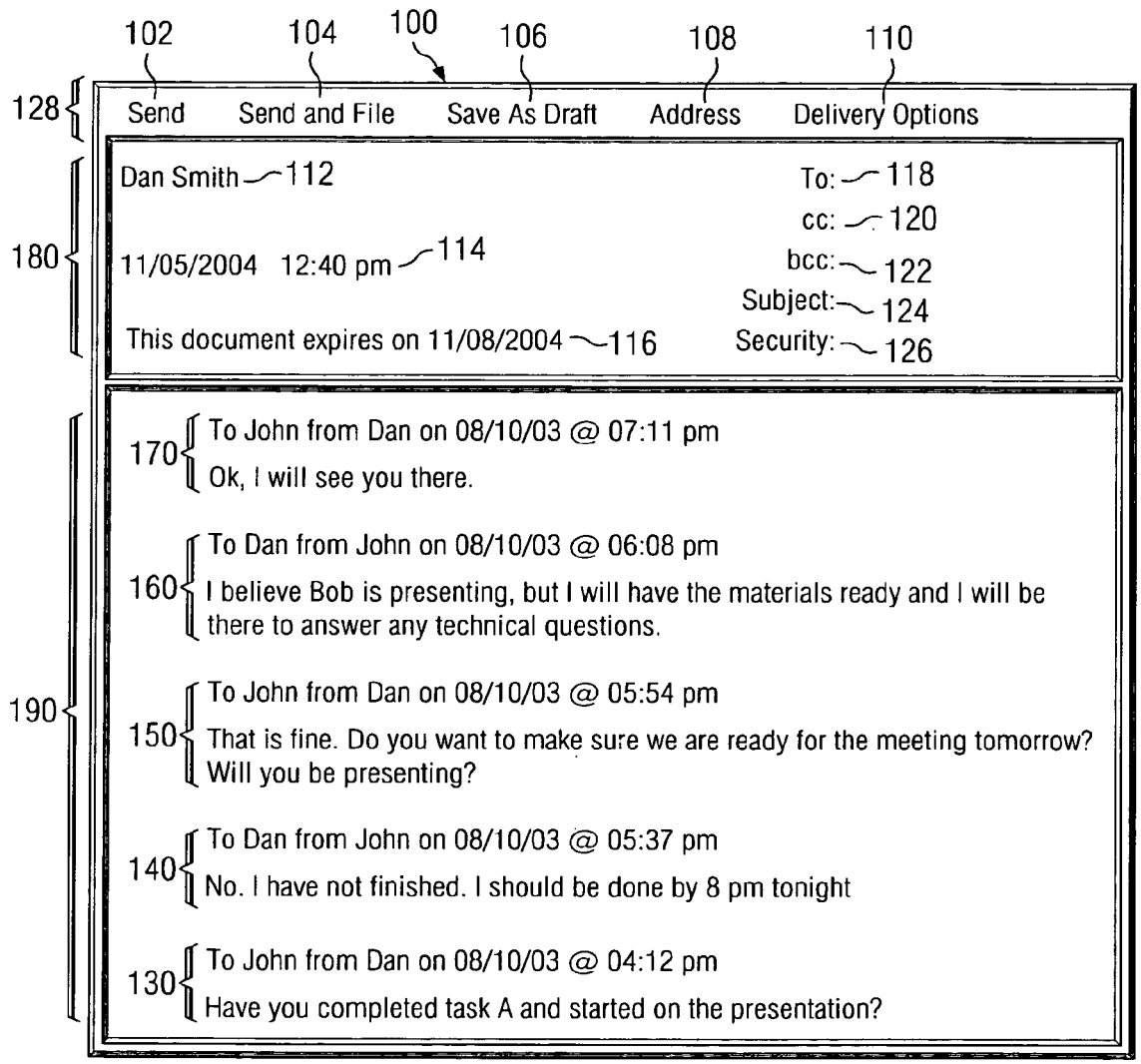
FIG. 1A depicts a typical prior art message display with a series of reply messages.
Figures 1B, 1C, 2:
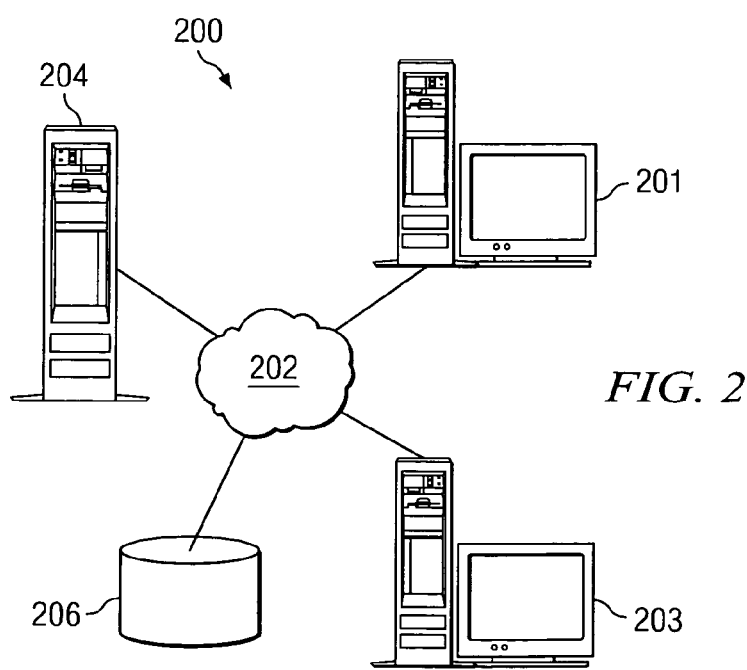
FIG. 1B depicts a chart of cumulative message content.
FIG. 1C depicts a chart showing the accumulation of duplicate message content.
FIG. 2 depicts a computer network in which the invention may be employed

FIG. 2 illustrates a common prior art architecture for connecting various hardware devices to create a network for transferring data. Computer network 200 comprises local workstation 201 electrically coupled to network connection 202. In FIG. 2, local workstation 201 is coupled electrically to remote workstation 203 via network connection 202. Local workstation 201 also is coupled electrically to server 204 and persistent storage 206 via network connection 202. Network connection 202 may be a simple local area network (LAN) or may be a larger wide area network (WAN), such as the Internet. While computer network 200 depicted in FIG. 2 is intended to represent a possible network architecture, it is not intended to represent an architectural limitation.

The internal configuration of a computer, including connection and orientation of the processor, memory, and input/output devices, is well known in the art. FIG. 3 represents the internal configuration of a computer having the computer program of the present invention loaded into memory 300. The computer program of the present invention is depicted as Duplicate Content Storage and Access Program (DCSAP) 330. As will be discussed further below, DSCAP 330 has a DSCAP Server Program (DSP) 400 (see FIG. 4), a DSCAP Client Program (DCP) 600 (see FIG. 6) and a DSCAP Auto Resolve Program (DAP) 700 (see FIG. 7), and Memory 300 also has repository 310 and messaging program 320. Memory 300 is only illustrative of memory within a computer and is not meant as a limitation.

In alternative embodiments, DCSAP 330 can be stored in the memory of other computers. Storing DCSAP 330, in the memory of other computers allows the processor workload to be distributed across a plurality of processors instead of a single processor. Further configurations of DCSAP 330 across various multiple memories and processors are known by persons skilled in the art.

FIG. 4 depicts a flow chart of DCSAP Server Program (DSP) 400. DSP 400 starts (402) and examines a message at the server (410). DSP 400 examines the email message to determine whether the message contains a section identifier embedded in the email. If the message does not contain a section identifier, then DSP 400 generates a section identifier (426), embeds the section identifier into the message (428) and forwards the message to the recipient (430). If at step 412, DSP 400 determines that a section of the message contains a section identifier, then DSP 400 extracts the section from the message (414) and stores the section in the repository (416). DSP 400 creates a doclink (418). DSP 400 generates a section identifier foi the remainder of the message and embeds the section identifier in the remainder (420). DSP 400 adds the doclink created at step 418 to the remainder (422), and forwards the remainder and the doclink to the recipient (424). If there is another email (432) DSP 400 goes to step 410. If there is not another email, DSP 400 stops (440).

Figure 5A:
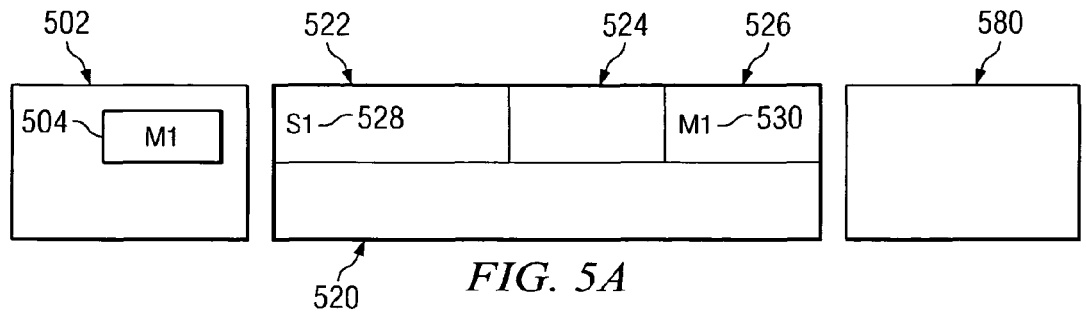
FIG. 5A through 5D graphically depict the sequence of creating doclinks.

FIG. 5A through FIG. 5D illustrate the display and storage results of employing DSP 400. Referring to FIG. 5A, M1 504 represents a message that has been prepared for sending on first display 502. Table 520 represents a memory for associating a message with a generated section identifier and a doclink. Table 520 has section identifier column 522, doclink column 524, and description column 526. As used herein, "M" represents a message section, "S" represents a section identifier, and "D" represents a doclink; furthermore, numerals added to the letters M, S, or D distinguish different message sections, section identifiers, and doclinks from other message sections, section identifiers, and doclinks. When sent, M1 504 is processed by DSP 400, section identifier S1 522 is generated and embedded in M1 504. S1 522 is entered in section identifier column 522 of table 520. Since this is the first time that M1 504 was sent, DSP 400 did not place a copy of M1 504 in storage and did not create a doclink for M1 504.

Figure 5B:
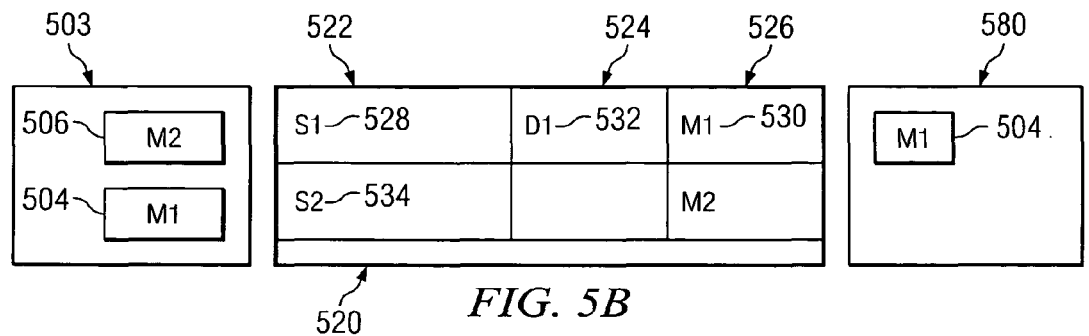

Referring to FIG. 5B, M2 506 represents a reply message composed by the recipient in response to M1 504 on second display 503. The recipient's message, consisting of M2 506 (the reply) and M1 504 (the original message), is processed by DSP 400. Since M1 504 has S1 528 embedded, M1 504 will be extracted and placed in repository 580. D1 532 will be created by DSP 400 and entered in table 520. When sent, the message will consist of M2 506 and D1 532.

Figure 5C:
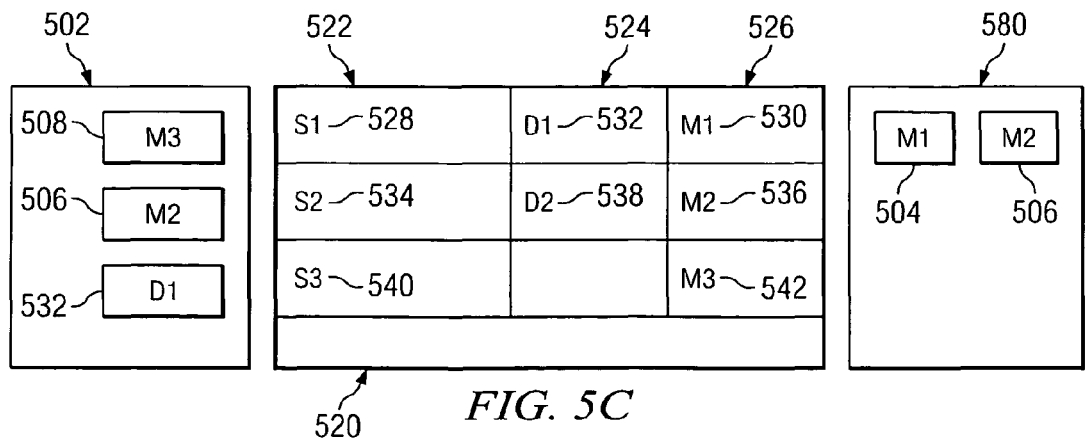

Referring to FIG. 5C, first display 502 shows the original sender received M2 506 and D1 532 and has composed M3 508 in reply. When the message consisting of M3 508, M2 506 and D1 532 is sent, DSP 400 will examine the message, determine that M3 508 does not have an embedded section identifier, generate and embed S3 540, and enter S3 540 in table 520. DSP 400 will determine that M2 506 has S2 534, extract M2 536, place it in repository 580, create D2 538 and forward the message consisting of M3 508, D1 532, and D2 538.

Figure 5D:
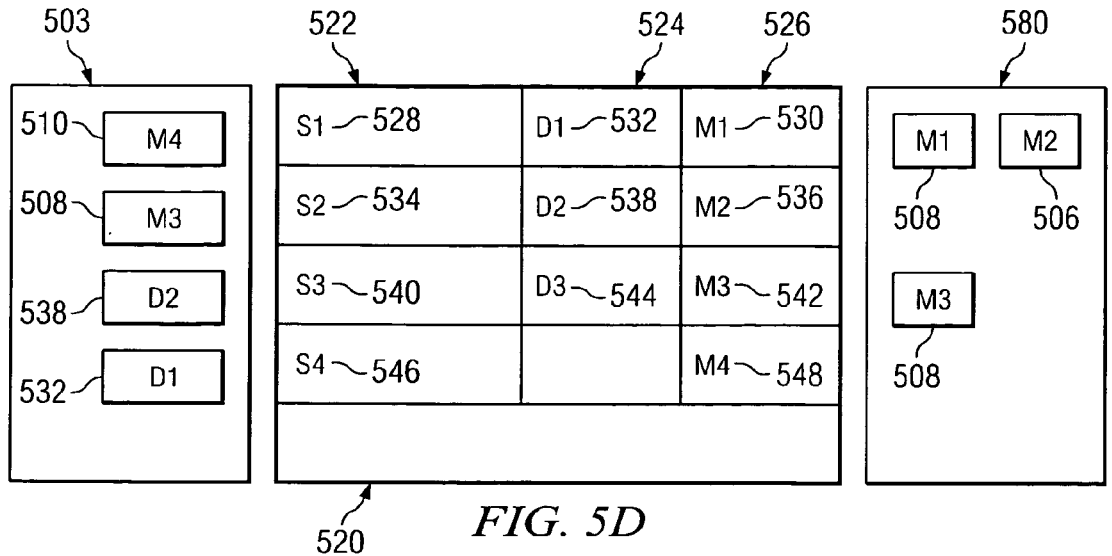

Referring to FIG. 5D, second display 503 shows that the recipient received M3 508, D2 538 and D1 532, and composed M4 510 in response to M3 508. When the message consisting of M4 510, M3 508, D2 538 and D1 532 is sent, DSP 400 will examine the message, determine that M4 510 does not have a section identifier, generate and embed S4 546 in M4 510, examine M3 508 and find that it contains S3 540, extract M3 508, place M3 508 in repository 580, create D3 544, and forward the message consisting of M4 510, D3 544, D2 538 and D1 532.

Figure 6:
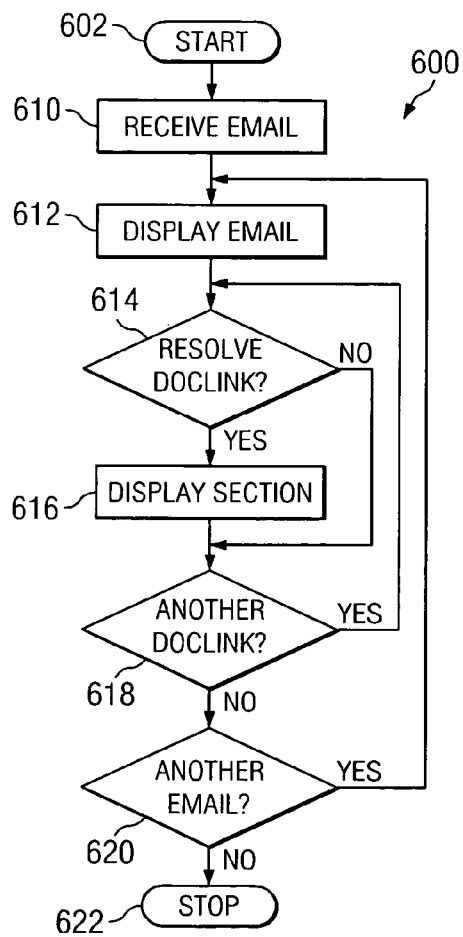
FIG. 6 depicts the operation of DCSAP in the client computer.

FIG. 6 represents DSCAP client process (DCP) 600. In the preferred embodiment, all doclinks are automatically resolved for the recipient so that the complete e-mail message appears. However, the recipient may elect to receive messages with doclinks unresolved so that only the original message and the doclinks appear. DCP 600 addresses the case where the recipient has elected to receive doclinks unresolved and receives the original message and the doclinks. DCP 600 starts (602) and receives a message (610). DCP 600 displays the message for the recipient (612). DCP 600 determines whether the recipient wants to resolve a doclink (614). If the recipient wants to resolve a doclink, then DCP 600 resolves the corresponding section in the repository into the client's display. DCP 600 determines whether there is another doclink (618), and if so, DCP 600 returns to step 614. If not, a determination is made as to whether there is another message (620). If so, DCP 600 returns to step 612. If not, DCP 600 stops (622). An alternate version of DCP 600 may function to change text back to docklinks. In such a case, a text message, that has been resolved from a doclink, is displayed, and the program determines whether the user wants to unresolve the text back into a doclink. If so, the program sends the text back to the repository and displays the doclink.

Figure 7:
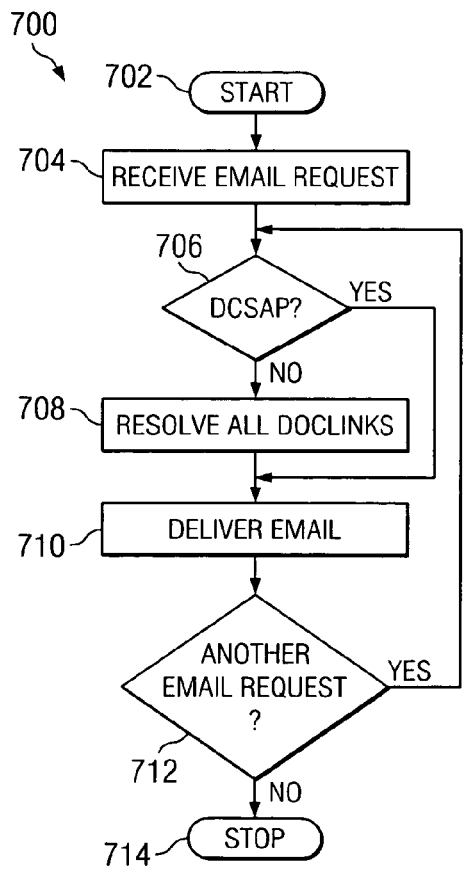
FIG. 7 depicts the operation of DCSAP in forwarding email to a non-DCSAP computer.

FIG. 7 shows DSCAP Auto Resolve Program (DAP) 700, the process for sending emails to a client computer that does not have DSCAP 330. A request for email is received from a computer (704). A determination is made as to whether the computer has DSCAP 330 installed (706). If so, DSCAP 700 goes to step 710. If not, all doclinks are resolved (708). The email is delivered (710). A determination is made as to whether there is another request for email (712). If so, DSCAP 700 goes to step 706. If not, DSCAP 700 stops (714).

Figure 8:
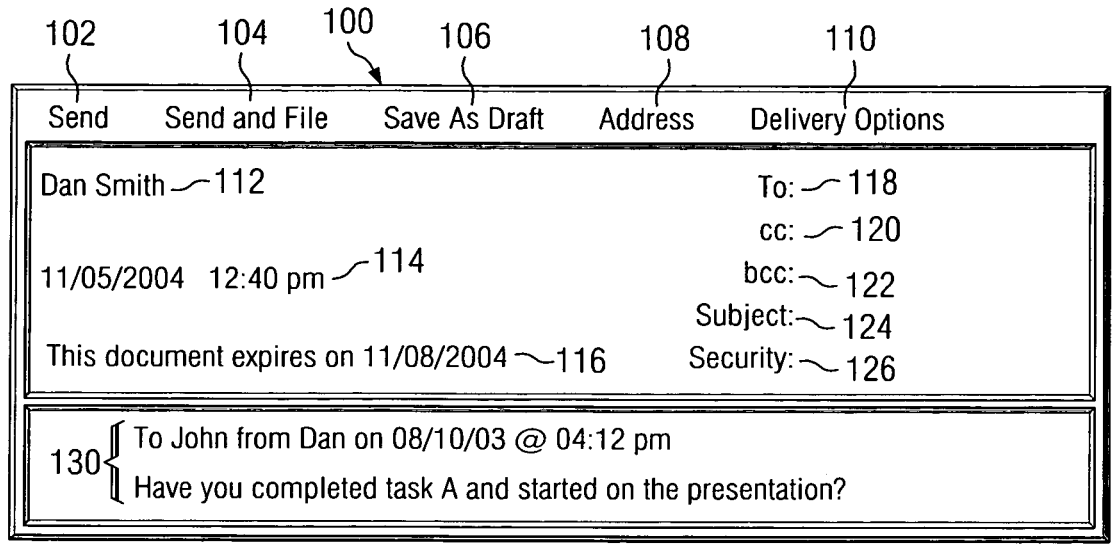
FIG. 8 depicts a first message.
Figure 9:
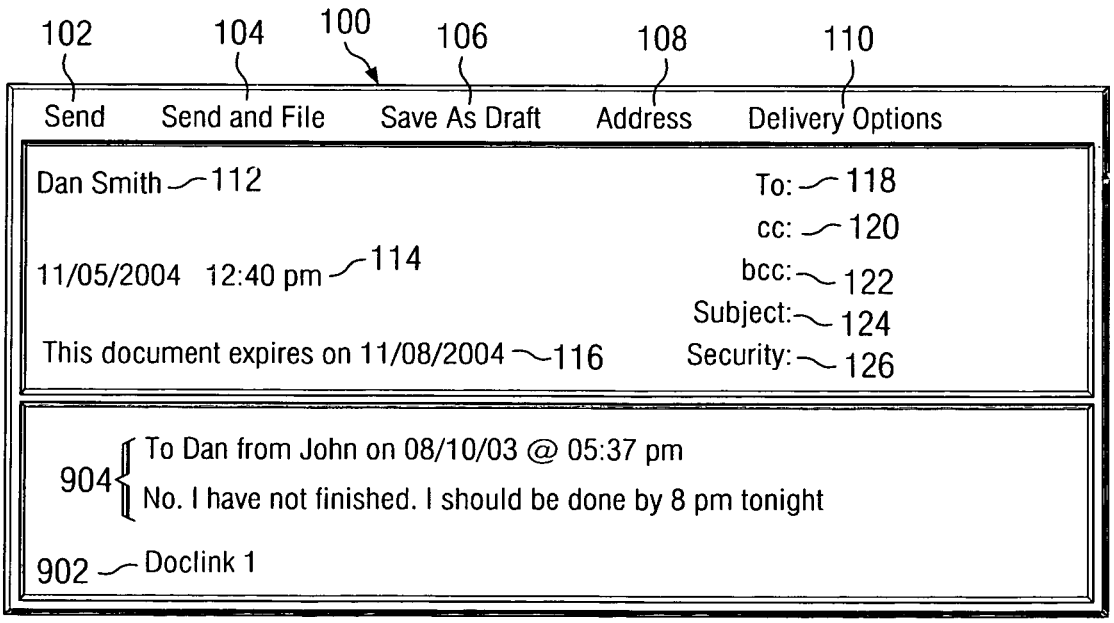
FIG. 9 depicts a reply message with doclink.

FIG. 8 depicts prior art display 100 for a messaging program having a utility area 180 and a message text area 190 as discussed previously in FIG. 1. First message 130 is an original message from Dan to John and is shown at the time it was composed. Referring to FIG. 8 through FIG. 11, the sequence of messages and the displays will be tracked with DSCAP 330 in operation. Dan's message 130 is sent, and DCP 400 (see FIG. 4) examines the message, determines that it does not have a section identifier, generates and embeds a section identifier, and forwards Dan's message 130 to John. John receives Dan's message 130, composes John's reply 904 and sends John's reply 904 and Dan's message 130 back to Dan. DSP 400 examines the message, determines that Dan's message 130 has a section identifier, extracts Dan's message 130 and replaces it with first doclink 902. FIG. 9 depicts display 100 at Dan's computer. John's message 904 is displayed along with first doclink 902 which can be resolved into message 130.

Figure 10:
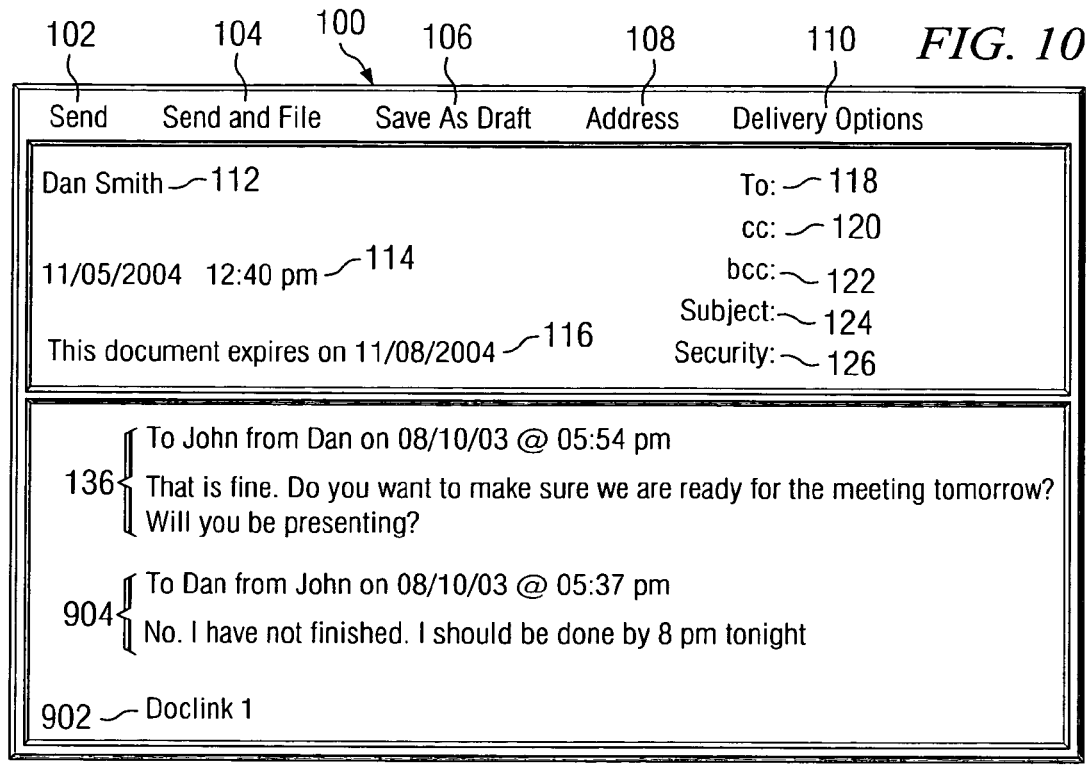
FIG. 10 depicts formation of a reply to a message with a doclink.

FIG. 10 shows display 100 with Dan's reply 136 to John's message 904. When Dan's reply 136, John's reply 904 and first doclink 902 are sent, DSP 400 examines the message and determines that Dan's reply 136 does not have a section identifier and that John's message 904 does have a section identifier. DSP 400 generates a section identifier and embeds it in Dan's reply 136. DSP 400 extracts John's message 904, places it in the repository, creates second doclink 906, and forwards Dan's reply 136, second doclink 906 and first doclink 902. John will receive the message with Dan's reply 136, first doclink 902 and second doclink 904 displayed (not shown). John will prepare and send a reply message (not shown).

Figure 11:
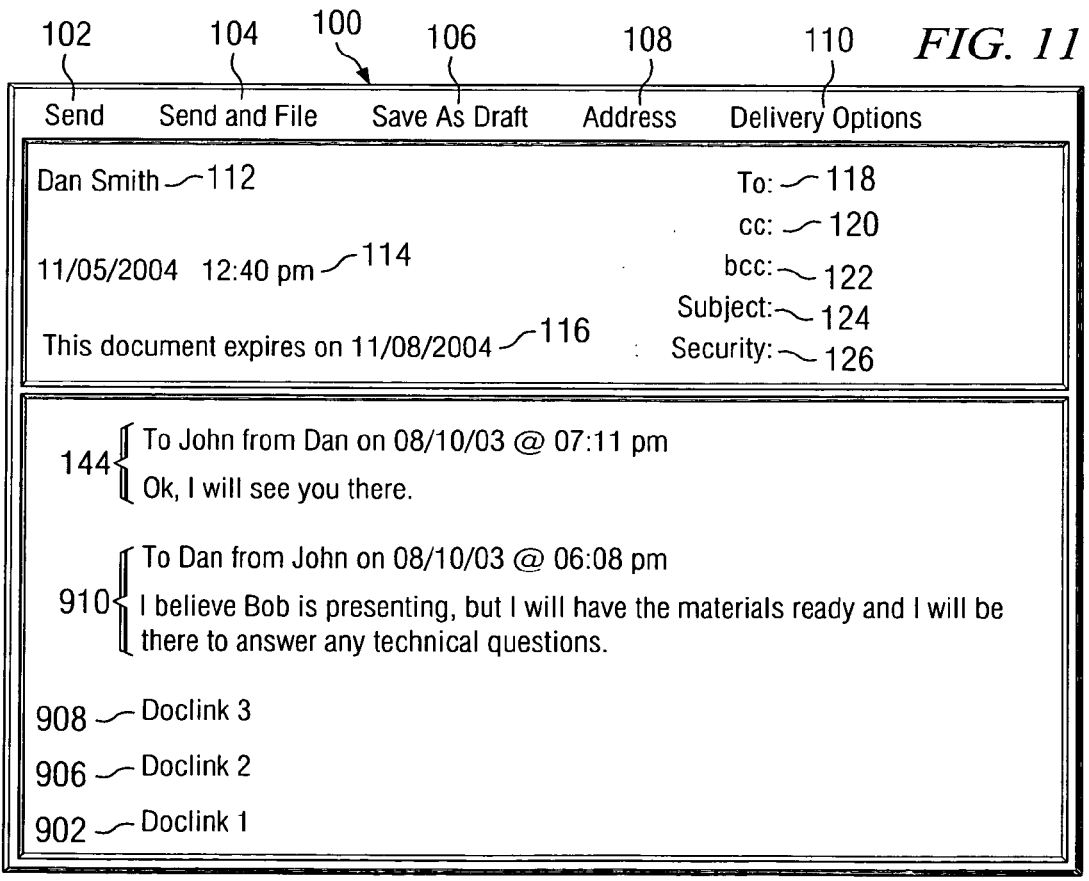
FIG. 11 depicts formation of a reply to a series of messages with three unresolved doclinks.
Figure 12:
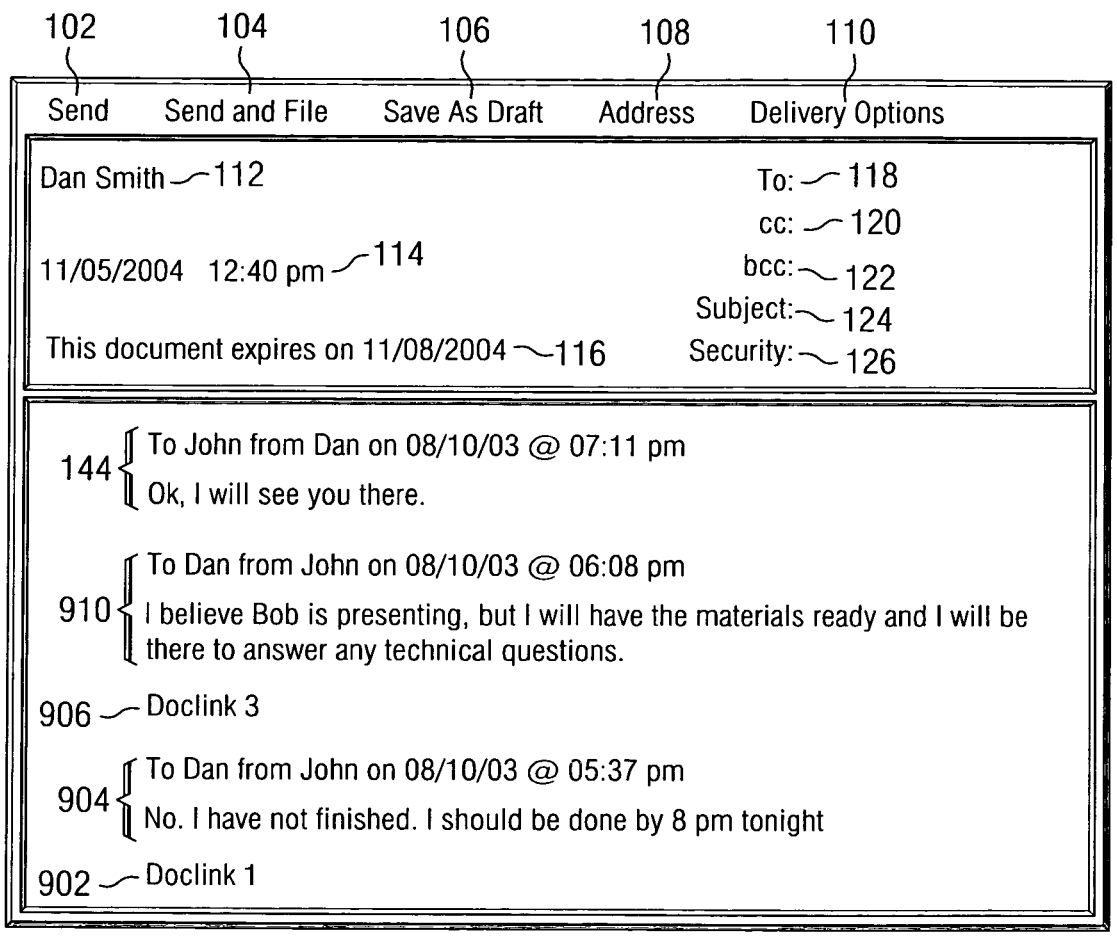
FIG. 12 depicts formation of a reply to a series of messages with two unresolved doclinks and one resolved doclink.

FIG. 11 depicts Dan's display 100 with John's reply message 910, first doclink 902, second doclink 906 and third doclink 908. Dan composes reply 144 and so on. FIG. 11 and FIG. 12 illustrate selective resolving of the doclinks. FIG. 12 shows display 100 with resolved second doclink 904 an unresolved third doclink 906 and unresolved first doclink 902.

Figure 13:
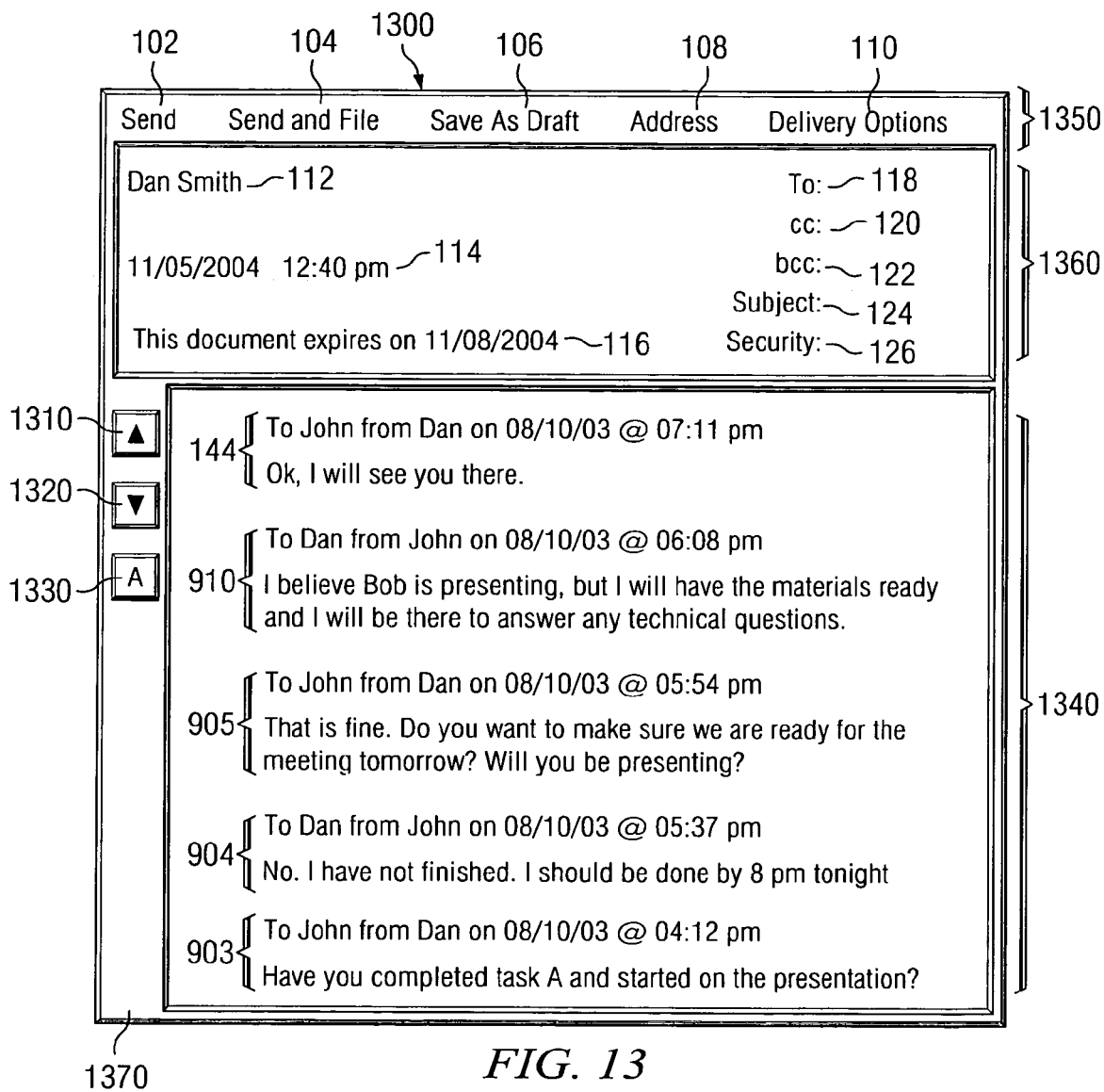
FIG. 13 depicts a message display area with a message control panel.

FIG. 13 shows enhanced display 1300. Enhanced display 1300 has all of the features of display 100 but additionally has control panel 1370. Control panel 1370 has first sort button 1310, second sort button 1320 and resolve all button 1330. First sort button 1310 provides for sorting sections in chronological order. Second sort button 1320 provides for sorting sections in reverse chronological order. Resolve all button 1330 provides a mechanism to resolve all doclinks at one time, or in the alternative, to restore all doclinks at one time.

Figure 14:
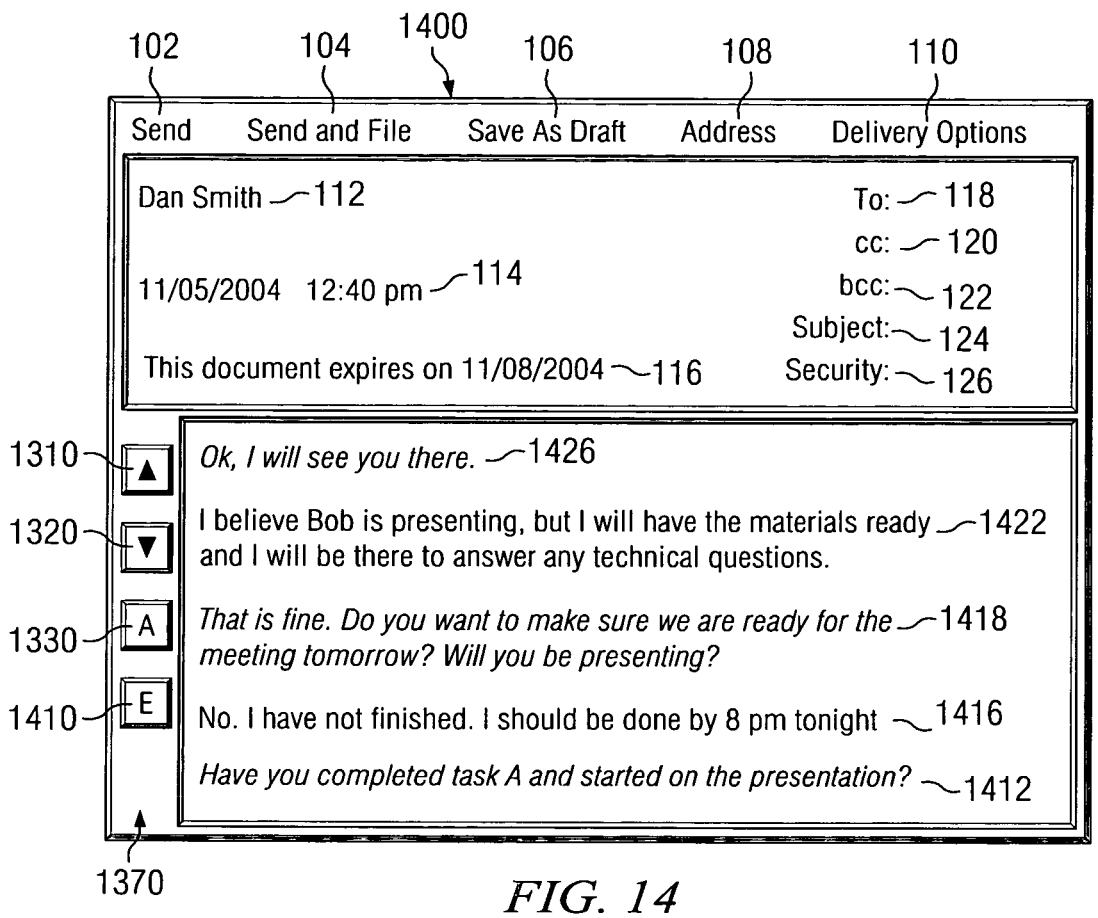
FIG. 14 depicts a message display area with messages having an effect enabled.

FIG. 14 shows display 1400. Display 1400 has all of the features of display 100 and display 1300 but adds effects button 1410 to control panel 1370. Effects button 1410 allows the user to elect to display the user's messages in a font that is different from the reply messages received, eliminating the need to display header information. Effects button 1410 allows a rapid scanning of the message flow and an easy visual recognition of who is writing. In an alternative embodiment, effects button 1410 may provide color coding of the text section background so that each author's message can be easily identified without header text.

FIG. 15 shows a section table that allows for additional features to be added to sections. By way of example, and not by way of limitation, table 1500 has section identification column 522, doclink column 524, description column 526, user identification column 1510, line column 1520, time column 1530, security column 1540, and effect column 1550. In the example shown, the same user is identified with all four sections. The line function allows message lines to be numbered and may be turned on or off (in the example all sections are off). Time column 1530 shows whether a date and/or time stamp is to be shown with the section, and in the example, M1 530 will have a date time stamp embedded with it. Security is shown to be on for M2 536 and M3 542, and off for M1 530 and M4 548. When security is off for a section, permission is granted to the recipient of the section to alter or modify the section. If security is on for a section, only the originator of the section will have permission to alter or modify the section. The security function takes on greater importance when only one copy of the section is stored in the repository. Effects column 1550 shows what effect has been enabled for each section. In the example, color background 1552 has been enabled for M1 530 and font 554 has been enabled for M4 548. Font 1554 may include italicization, bolding, a different font face from the original message, or a different size font from the original message.

Figure 16A:
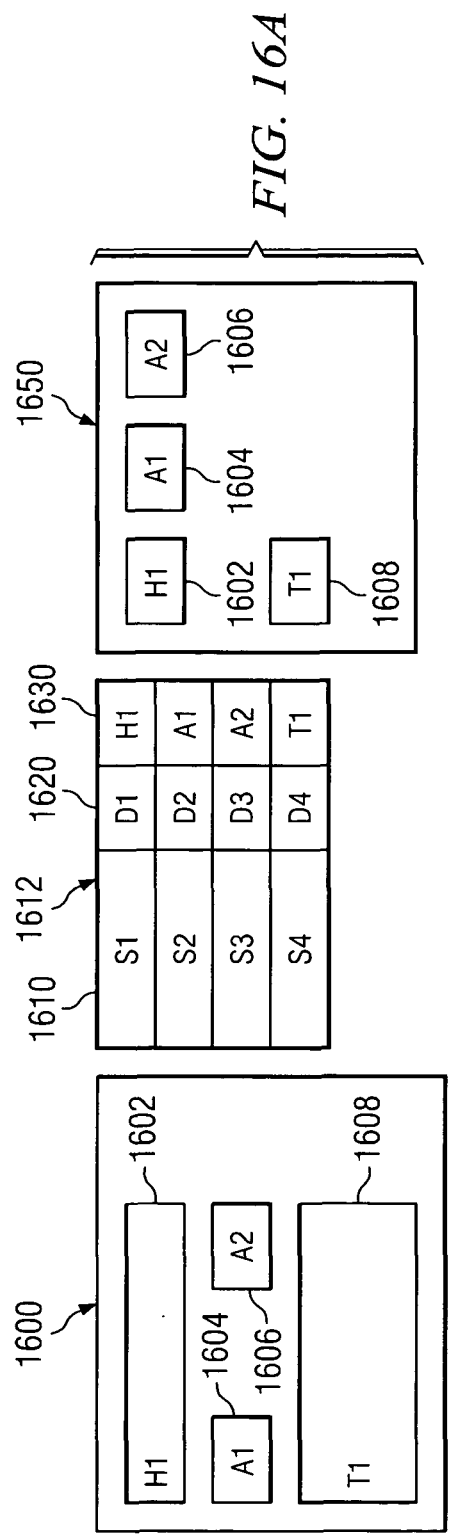
Figure 16B:
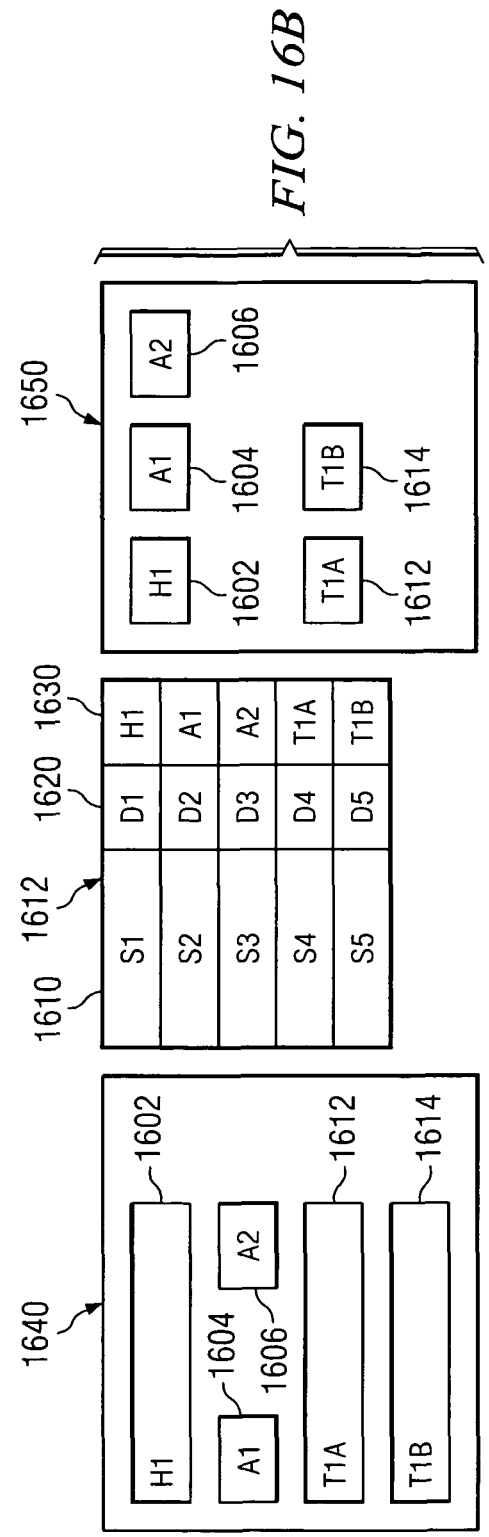

FIGS. 16A through 16C illustrate how the invention may be expanded in order to divide the email up into additional sections. In FIG. 16A email 1600 is shown having header H1 1602, attachment A1 1604, attachment A2 1606, and text 1608. When email 1600 is processed by DSP 400 the first time, a section identifier will be assigned to each element as shown in first column 1610 and third column 1630 of table 1612. When message 1600 is transmitted with a reply and is processed by DSP 400 a second time, doclinks will be added as shown in second column 1620 of table 1612, and each section with a doclink will be stored in repository 1650. Message 1600 shows a level of granularity in which headers, attachments and text may be stored and accessed as separate sections with separate doclinks.

In the event that additional granularity is desired, the text of a message may be divided into paragraphs. FIG. 16B shows message 1600 divided into header H1 1602, attachment A1 1604, attachment A2 1606, first paragraph T1A 1612, and second paragraph T1B 1614. Table 1612 first column 1610 now has five unique section identifications, and repository 1650 now has five stored sections. Each paragraph could be further divided into sentences. For purposes of illustration it is assumed that each paragraph contains two sentences. FIG. 16C shows message 1600 divided into header H1 1602, attachment A1 1604, attachment A2 1606, first sentence first paragraph T1A1 1616, second sentence first paragraph T1A2 1622, first sentence second paragraph T1B1 1624, and second sentence second paragraph T1B2 1626. Table 1612 now has seven unique section identifications in first column 1610, and repository 1650 contains seven sections each having its own doclink that may be resolved into the corresponding section.

Persons skilled in the art are aware that situations may arise in which text is added to an original message during a transmission of the message with a reply. In an additional embodiment, text comparison features may be added so that revised text will be identified and treated as a new section so that a section identifier is generated and embedded in the new section.

In an additional embodiment, a user at a client computer may choose to replicate the repository files on his local computer.

In an additional embodiment, user identifications may be utilized so that sections identified by a particular user identification may be downloaded onto a local computer and sorted by subject, name, text pattern matching and other features that may be implemented.

In an additional embodiment, emails having a doclink may be sorted by user identification, date, time, or effect.

In an additional embodiment, control panel 1370 may be a displayed as a separate window from the email display.

In an additional embodiment, icons for control panel 1370 may be configurable by the user.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer implemented method for reducing utilization of disk storage space due to duplicate content in electronic mail message transmission, the method comprising:
   intercepting, at a server, an email from a second user to a first user in a thread of emails between a first user and a second user, the email comprising a first message created by the first user and a second message created by the second user;
   responsive to determining that the first message includes a first section identifier, extracting the first message from the email, saving the first message in a repository connected to the server, generating a doclink, and replacing the first message in the email with the doclink;
   responsive to determining that the second message does not include a section identifier, generating a second section identifier, and embedding the second section identifier in the second message;
   sending the email to the first user at a first computer; and
   responsive to the first user opening the email at the first computer, automatically resolving the doclink into a representation of the first message so that an entire email is displayed.

2. The computer implemented method of claim 1 further comprising:
   responsive to saving the first message in the repository, storing the first message in a description column of a table, storing the first section identifier in a section identification column of the table, and storing the doclink in a doclink column of the table;
   wherein the table has a plurality of additional columns including a user identification column, a line column, a time column, a security column, and an effect column;
   wherein the line column, responsive to showing on, allows line numbering to be applied to the first message;
   wherein the time column, responsive to showing on, determines that a date and time stamp is to be shown with the first message when the first message is displayed;
   wherein the security column, responsive to showing on, determines that only the first user has permission to alter or modify the message; and
   wherein, the effect column contains an effect, when an entry is made, enable the first message to be displayed with a color background, an italicization, a specified font size, a specified font face, or with text bolded.

3. An apparatus, comprising:

a computer having a processor connected to a memory; and
an email cleaning utility stored in the memory, the email cleaning utility containing a plurality of instructions adapted to cause the processor to perform steps comprising:
intercepting a plurality of emails;
determining whether any email contains a section identifier, wherein the section identifier is a data element previously assigned by an algorithm in such a manner that no two section identifiers are the same;
responsive to determining that an email does not contain a section identifier, embedding a new section identifier into the email and forwarding the email;
responsive to determining that the email contains one or more section identifiers, extracting from the email each section that has an assigned section identifier, storing each section extracted from the email in a repository, creating a doclink to each section extracted from the email and stored in the repository, assigning a new section identifier to a remainder section of the email, and forwarding the remainder section with the new section identifier and each doclink for each section extracted from the email to a recipient;
wherein responsive to activation each doclink resolves into a representation of a corresponding section in the repository; and
wherein a storage of a duplicate content is eliminated while permitting a selective access to each section having a doclink in the plurality of emails.

4. The apparatus of claim 3, further comprising:
adding a security permission, a sorting preference, and a display effect to the doclink.

5. A computer program product, comprising:

a computer readable storage device; and
an email cleaning utility stored in the computer readable storage device, the email cleaning utility containing a plurality of instructions adapted to cause a processor of a computer to perform steps comprising:
intercepting a plurality of emails;
determining whether any email contains a section identifier, wherein the section identifier is a data element previously assigned by an algorithm in such a manner that no two section identifiers are the same;
responsive to determining that an email does not contain a section identifier, embedding a new section identifier into the email and forwarding the email;
responsive to determining that the email contains one or more section identifiers, extracting from the email each section that has an assigned section identifier, storing each section extracted from the email in a repository, creating a doclink to each section extracted from the email and stored in the repository, assigning a new section identifier to a remainder section of the email, and forwarding the remainder section with the new section identifier and each doclink for each section extracted from the email to a recipient;
wherein responsive to activation each doclink resolves into a representation of a corresponding section in the repository; and
wherein a storage of a duplicate content is eliminated while permitting a selective access to each section having a doclink in the plurality of emails.

6. The computer program product of claim 5, further comprising:
adding a security permission, a sorting preference, and a display effect to the doclink.

* * * * *